June 17, 1969
J. F. HOLMES
3,450,984
METHOD AND APPARATUS FOR MEASURING THE FLOW VELOCITY OF AN ELECTROLYTIC FLUID BY ELECTROLYSIS
Filed Oct. 21, 1965
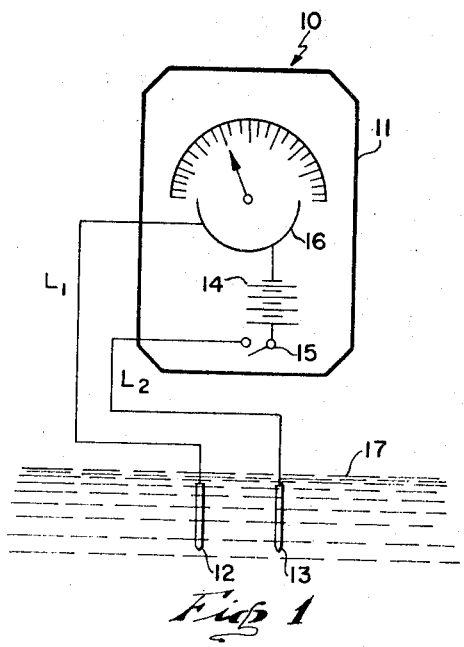
Fig. 1
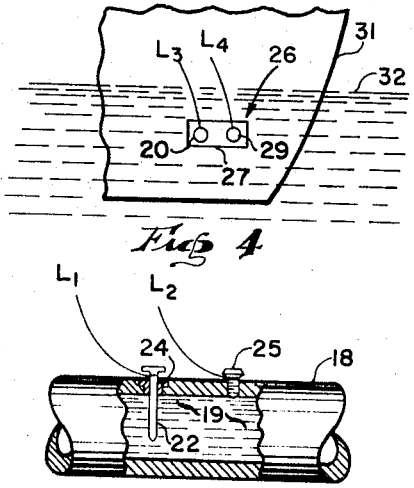
Fig. 4
Fig. 3
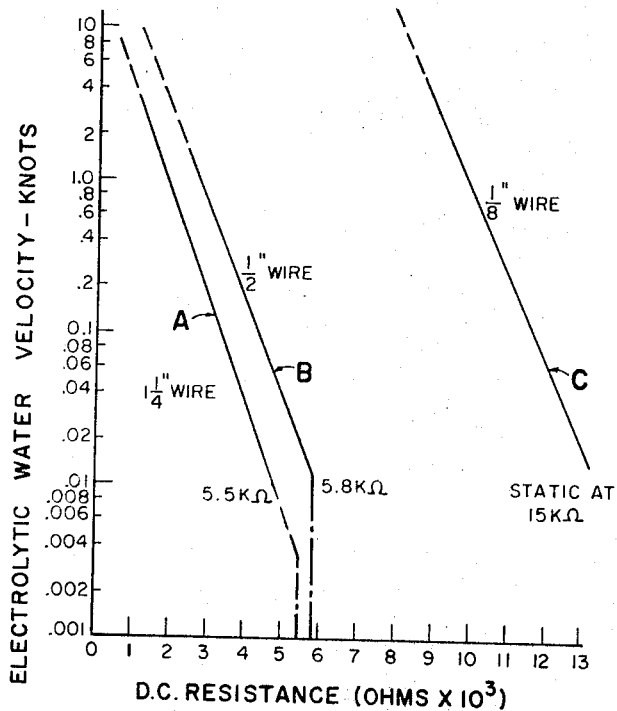
Fig. 2
INVENTOR
JOHN F. HOLMES
BY Alden D. Redfield
Auley Brine
ATTORNEYS United States Patent Office 3,450,984
Patented June 17, 1969

3,450,984
METHOD AND APPARATUS FOR MEASURING THE FLOW VELOCITY OF AN ELECTROLYTIC FLUID BY ELECTROLYSIS
John F. Holmes, Andover, Mass., assignor to Avco Corporation, Cincinnati, Ohio, a corporation of Delaware
Filed Oct. 21, 1965, Ser. No. 499,430
Int. Cl. G01r *11/44*
U.S. Cl. 324—30      6 Claims

ABSTRACT OF THE DISCLOSURE

This invention relates to flow meter apparatus and more particularly to a device for measuring the flow velocity of an electrolytic fluid. A pair of electrodes are inserted in the fluid and a polarizing current capable of electrolyzing the fluid is passed between the electrodes. During the electrolysis process a product of the electrolysis accumulates at one electrode and becomes a current limiting medium. The accumulation is a function of the relative velocity between the fluid and the electrode.

---

Heretofore, there have been a great number of devices proposed and developed for measuring the velocity of fluid flow. These devices have included propeller blades and veins introduced into the fluid flow together with complex instrumentation to translate the mechanical motion produced by flow into a readily useable unit of measure. Many of these items have proved inadequate in operation because of poor reliability inherent in such complex devices. In addition, they require the introduction of parts into the fluid which parts are often susceptible to deterioration when subjected to highly corrosive fluids.

It is, therefore, an object of the present invention to provide a device for measuring the flow velocity of a fluid which is simple in construction and reliable in operation.

It is a further object of the invention to provide a device for measuring the flow velocity of a fluid which device has a minimum number of moving parts and requires the introduction of only a minimum surface area into the fluid to be measured.

Another object of the invention is to provide a method of measuring the flow velocity of a fluid which is simpler to perform than prior art methods.

A further object of the invention is to provide a method of measuring the flow velocity of a fluid wherein the velocity is read directly by employing an electric resistance measuring device.

These objects of the invention, and other objects which will become apparent as the description proceeds, are achieved by providing a device which comprises two electrodes upon which positive and negative electric polarities are induced.

The method of operation provides for introducing the electrodes into the fluid causing a direct electric current flow therebetween. The flow of electric current causes a removable medium in the form of gas bubbles of minute dimension to appear on both the anode and cathode, by reason of electrolytic action.

The measurement of electrical resistance of paths between the two electrodes has been found to vary as the area covered by the bubbles. Therefore, a measurement of the total path resistance gives a direct indication of the local fluid velocities, as the flow velocities are functionally related to the bubble quantity.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 1 is a schematic view showing a device for measuring the flow velocity of a fluid constructed in accordance with the teachings of the present invention;

FIGURE 2 is a plot for saline water velocity and direct current resistance showing data compiled employing a device substantially as shown in FIGURE 1;

FIGURE 3 is an elevational view, partially in section, showing an application of the device shown in FIGURE 1; and FIGURE 4 is an elevational view showing schematically an alternate application of the invention shown in FIGURE 1.

Referring now to the drawings, especially FIGURE 1, there is shown a flow measuring device 10 comprising a casing 11 having a pair of electrical leads $L_1$ and $L_2$ leading into the interior of the casing. The leads $L_1$ and $L_2$ may be of any suitable length and are insulated to prevent short circuiting the device 10. A pair of electrodes 12 and 13 are shown connected to the leads $L_1$ and $L_2$ respectively by any suitable manner well known in the art. Although the electrodes 12 and 13 are shown to be be separate probe type elements in the schematic of FIGURE 1, the electrodes may be provided by merely removing a portion of the insulation from the lead $L_1$ or $L_2$ to produce a bare wire, which serves as an electrode.

The interior of the casing 11 provides a means for measuring the electrical resistance between the electrodes 12 and 13. The internal portion of the casing 11 contains the usual elements found in a standard ohmmeter, which include a voltage source in the form of dry cell battery 14 having the lead $L_2$ connected to its positive terminal and the lead $L_1$ connected to its negative terminal. The electrical circuit comprising the leads $L_1$ and $L_2$ and the battery 14 is completed with the introduction of a switch 15 and an electric current reading means provided by a milliammeter 16.

In operation, the electrodes 12 and 13 are introduced into a fluid 17 having electrolytic qualities. The measuring device 10 is then readied for operation by closing the switch 15 to energize the circuit. When first used, the milliammeter dial 16 is adjusted to a 0 position when there is 0 flow at the electrodes 12 and 13.

With the circuit energized, polarization takes place at the surface of the electrodes 12 and 13, and gases are produced on the electrodes in the form of minute bubbles caused by disassociation of the fluid along the surface of the electrodes. Since the electric current in the circuit is limited by the resistance of the gas bubbles, the electric current measured by the milliammeter 16 is directly influenced by the gas bubbles formed at any instant on the electrodes 12 and 13.

When the fluid 17 is caused to flow over the electrodes 12 and 13, the flow produces a wiping action over the electrodes. This wiping action removes the gas bubbles produced by the electrolysis of the fluid, and lowers the resistance of the electric circuit. At any given instant therefore, the resistance measured in the electric circuit, and indicated by the milliammeter 16 is found to be proportional to the velocity of the fluid flow.

The electric current reading taken at the milliammeter 16 may be compared with a plot similar to FIGURE 2 (which will be explained in detail as the description proceeds) to determine the velocity flow of the fluid. However, to facilitate rapid measurement of fluid flow, the milliammeter 16 is generally provided with a direct reading dial having indica corresponding to standard units of measurement of fluid velocity, such as knots, feet per second, feet per minute, etc.

Referring in detail to the electrodes 12 and 13, it should here be noted that the surface area exposed to the fluid to be measured, as well as the material used for the electrodes, may differ from one application to another. Generally, the electrodes 12 and 13 are composed of any metal, or metal composition which is compatible with the voltage source employed to produce a significant change in electric current over the entire fluid flow range which is desired to be measured.

At times, the choice of materials for electrodes 12 and 13 may be dictated by the corrosive qualities of the fluid 17. When this approach is necessary, the voltage of the battery 14 is adjusted to give significant readings on the milliammeter 16 to indicate the range of flow to be measured in the fluid 17.

In the fluid flow measurement of saline water such as an ocean current, copper, gold and platinum have been used. Of these three metals employed for sea water electrodes, the platinum electrodes appeared to be best suited to its environment after repeated use. However, in an environment of highly corrosive acid (such as hydrofluoric acid) the electrodes 12 and 13 could be comprised of lead, or a lead composition, to retard deterioration of the electrode surfaces.

In FIGURE 2, there is shown a plot of curves prepared by using a No. 20 copper wire of varying lengths as electrodes 12 and 13 in a saline solution, and applying an EMF of 1.3 volts in the circuit by means of the battery 14.

The plot shown by the line A was developed using a 1 and ¼ inch length of electrode, and as will be noted, the device 10 provided means for measuring the velocity of the saline water flow over a range of 0.1 to knot to 10 knots.

The plot shown by line B was similarly arrived at through experimentation, but in this instance an electrode length of ½ inch was employed. The plot shown by the line C was developed using an electrode length of ⅛ inch and, as will be noted, the resistance has approximately doubled from that produced by employing the ½ inch electrodes. However, the set-up is still effective to measure fluid velocity over the range fo .01 to 10 knots.

The system used to prepare the plot shown in FIGURE 2 was specifically designed for use in the measurement of sea water velocity over a relatively low range of values and was found to be sensitive to velocity changes over substantially three orders of magnitude.

Although the plots shown in FIGURE 2 are specifically directed to the measurement of saline water, using a No. 20 copper wire and a voltage source as indicated above, it should be obvious that the velocity of any other electrolytic fluid could be measured and a calibration curve produced over the range of velocity to be measured by an expedient choice of wire size and voltage source.

Referring to FIGURE 3, there is shown an application of velocity flow measurement for which the present invention is readily adaptable. A conduit or pipe 18 contains an electrolytic fluid 19 which is subject to varying flow velocities. The pipe 18 may be used to transfer fluids during any known chemical process where it is desirable to control the flow rate. As shown now be obvious from the preceding description, the pipe 18 may be provided with a pair of electrodes 12 and 13 as shown in FIGURE 1, each introduced into the fluid flow, and the fluid flow thus measured as previously described.

However, as shown in FIGURE 3, the lead $L_1$ is connected in the usual manner to an electrode 22 which is introduced into the fluid 19 through an insulating means 24. An electrical terminal 25 is provided in the pipe 18 and a lead $L_2$ is connected to the terminal. In the embodiment shown in FIGURE 3 therefore the pipe 18 forms an electrode performing the same function as the electrode 13 shown in FIGURE 1.

In this application as in the previous applications, the pipe 18 and the electrode 22 should be chosen of the same material to prevent electrical deposition of the electrodes one to the other.

It should be here mentioned that in gathering the data for the plot shown in FIGURE 2, the effect of fluid flow was almost entirely found to be produced at the negative electrode. The small effect produced at the positive electrode was considered to be the result of the CL and OH ions carried away by the fluid flow. Test results therefore indicate that in this application the design of an operational instrument could have the negative electrode as the flow sensor and the positive electrode merely in contact with the fluid at any convenient point.

In FIGURE 4, still a further modification of the invention is shown wherein an article of manufacturer 26 comprises a carrier element 27 in the form of a thin sheet having adhesive applied to one face surface to facilitate application of the carrier to a desired location on a surface. The carrier 27 has disposed on the opposite face a pair of electrodes designated as 28 and 29. In schematic, the electrodes 28 and 29 are shown as disc shaped members. However, they may be of any shape and may even be a portion of insulated No. 20 wire having metallic surfaces exposed, as used in the previous applications.

The article of manufacture 26 is best described as a "flow gauge" being similar in operation and appearance to the well known strain gauge and has a wire $L_3$ connected to electrode 28 and a lead $L_4$ connected to electrode 29. The leads $L_3$ and $L_4$ are adapted to be interconnected to a resistance measuring means in a similar manner to leads $L_1$ and $L_2$ of FIGURE 1. In application, the leads $L_3$ and $L_4$ may also be directly connected to a flow measuring device 10 as previously described, in which case the flow velocity of a fluid would be directly read from the device.

It should be apparent that the flow gauge provided by the article 26 has many useful applications one of which is shown in FIGURE 4, wherein the article is attached to the hull 31 of a water craft below the surface of the water 32. The hull 31 of a boat or submarine, may be instrumented through the use of a plurality of articles 26 and the laminar flow measured over the entire hull in a simple and inexpensive manner.

From the foregoing, it should be apparent that the present invention provides a device and method for measuring the flow velocity of an electrolytic fluid which is less complex and less expensive than prior art devices and methods. The invention has many promising applications due to its ability to measure small units of fluid flow over a substantially wide range.

In addition, the sensitivity of the device in the low velocity range makes this invention useful in oceanography for indicating the flow over a free neutrally buoyant instrument (such as a Swallow Float) as the small size of the sensing electrodes causes a minimum reaction on the float from any vertical flow of fluid.

I claim:
1. In a system for measuring the rate of flow of an electrolyte a fluid flow circuit comprising a series electrical current path including an electrolyte, two spaced electrodes mounted for relative movement with said elecrtolyte and in contact with the electrolyte with at least one electrode immersed in the electrolyte, a means for measuring the electrical resistance of the electrolyte between said spaced electrodes and electrical power supply means for generating predetermined polarizing current between said two electrodes for electrolyzing the fluid between said electrodes for causing an accumulation of gas bubbles in the current path of said electrodes whereby said gas bubbles are displaced at a rate dependent upon said electrolyte flow rate to result in a measured resistance change as an indication of electrolyte flow rate.

2. The device of claim 1 wherein said resistance measuring means comprises;

an electric circuit containing a voltage source having a negative terminal connected to one of said electrodes and a positve terminal connected to the other of said electrodes and means in said circuit for measuring and indicating the electric current in said circuit.

3. The device of claim 2 which is further characterized by said means for measuring and indicating current being provided with indicia corresponding to fluid velocity, whereby the velocity of fluid flow is read directly as a function of electric current.

4. A method of measuring the flow velocity of an electrolytic fluid, which gives rise to gas bubbles on the electrodes when undergoing electrolysis which comprises the steps of;

introducing a pair of spaced electrodes into the fluid, in reltaive motion with said electrolytic fluid, producing at a predetermined rate electrolysis of said fluid and readily removable gas bubbles on said electrodes while said lectrodes are in the fluid, and measuring the change in resistance between the electrodes due to removal of said gas bubbles due to electrolyte fluid flow to determine the change in velocity of fluid flow at the electrodes.

5. The method of measuring the flow velocity of an electrolytic fluid which gives rise to gas bubbles on the electrodes when undergoing electrolysis, which comprises the steps of:

providing a circuit having a voltage source with a first electrode connected to its positive terminal and a second electrode connected to its negative terminal, said electrodes being spaced in relative movement with the electrolytic fluid, introducing one of said electrodes into that portion of the fluid at which the flow is to be measured, placing the other of said electrodes in contact with the fluid, producing at a predetermined rate electrolysis of said liquid between said electrodes and an accumulation of gas bubbles on one of said electrodes, and measuring the changes in electrical current flow in said circuit due to removal of said gas bubbles due to electrolyte fluid flow to determine the change in flow velocity of the fluid.

6. The method of measuring the flow velocity of an electrolytic fluid which gives rise to gas bubbles on the electrodes when undergoing electrolysis with respect to a body which comprises the steps of;

providing a pair of spaced electrodes, in relative motion with the electrolytic fluid, introducing said electrodes into the fluid such that at least one of said electrodes is at the point of velocity measurement and affixed to the body, inducing a positive polarity on one of said electrodes and a negative polarity on the other of said electrodes, producing at a predetermined rate electrolysis of said liquid between said electrodes and an accumulation of an electrolysis product gas bubbles on one of said electrodes, and measuring the change in resistance between said electrodes due to removal of said gas bubbles due to electrolyte fluid flow to determine the change in fluid velocity at the point of measurement.

References Cited

UNITED STATES PATENTS

| | | | |
|---|---|---|---|
| 993,586 | 5/1911 | Digby et al. | 324—30 |
| 1,923,889 | 8/1933 | Sauter | 324—65 X |
| 2,532,929 | 12/1950 | McBrayer | 324—65 |
| 2,553,754 | 5/1951 | Dietert et al. | 324—65 |
| 2,824,282 | 2/1958 | Posey | 324—30 X |
| 2,985,305 | 5/1961 | Nock et al. | |
| 3,242,729 | 3/1966 | Keller | 324—30 X |
| 3,324,720 | 6/1967 | Sutherland. | |

RUDOLPH V. ROLINEC, *Primary Examiner.*

C. F. ROBERTS, *Assistant Examiner.*

U.S. Cl. X.R.

73—194; 204—1

PO-1050
(5/69)

UNITED STATES PATENT OFFICE
CERTIFICATE OF CORRECTION

Patent No. 3,450,984          Dated June 17, 1969

Inventor(s) JOHN F. HOLMES

It is certified that error appears in the above-identified patent and that said Letters Patent are hereby corrected as shown below:

Column 2, line 27, omit "be". Column 3, line 35, for "0.1 to knot" read --.01 knots--; line 44, for "fo" read --from--; line 63 for "shown" read --should--. Column 4, line 28, after "wire" read --lead--. Column 5, line 3, for "positve" read --positive--; line 16, for "reltaive" read --relative--; line 19, for "lectrodes" read --electrodes--; line 40, for "fiow" read --flow--.

SIGNED AND
SEALED
MAR 10 1970

(SEAL)
Attest:

Edward M. Fletcher, Jr.
Attesting Officer

WILLIAM E. SCHUYLER, JR.
Commissioner of Patents